H. R. SETZ.
LIQUID FUEL COMBUSTION ENGINE.
APPLICATION FILED FEB. 27, 1909.

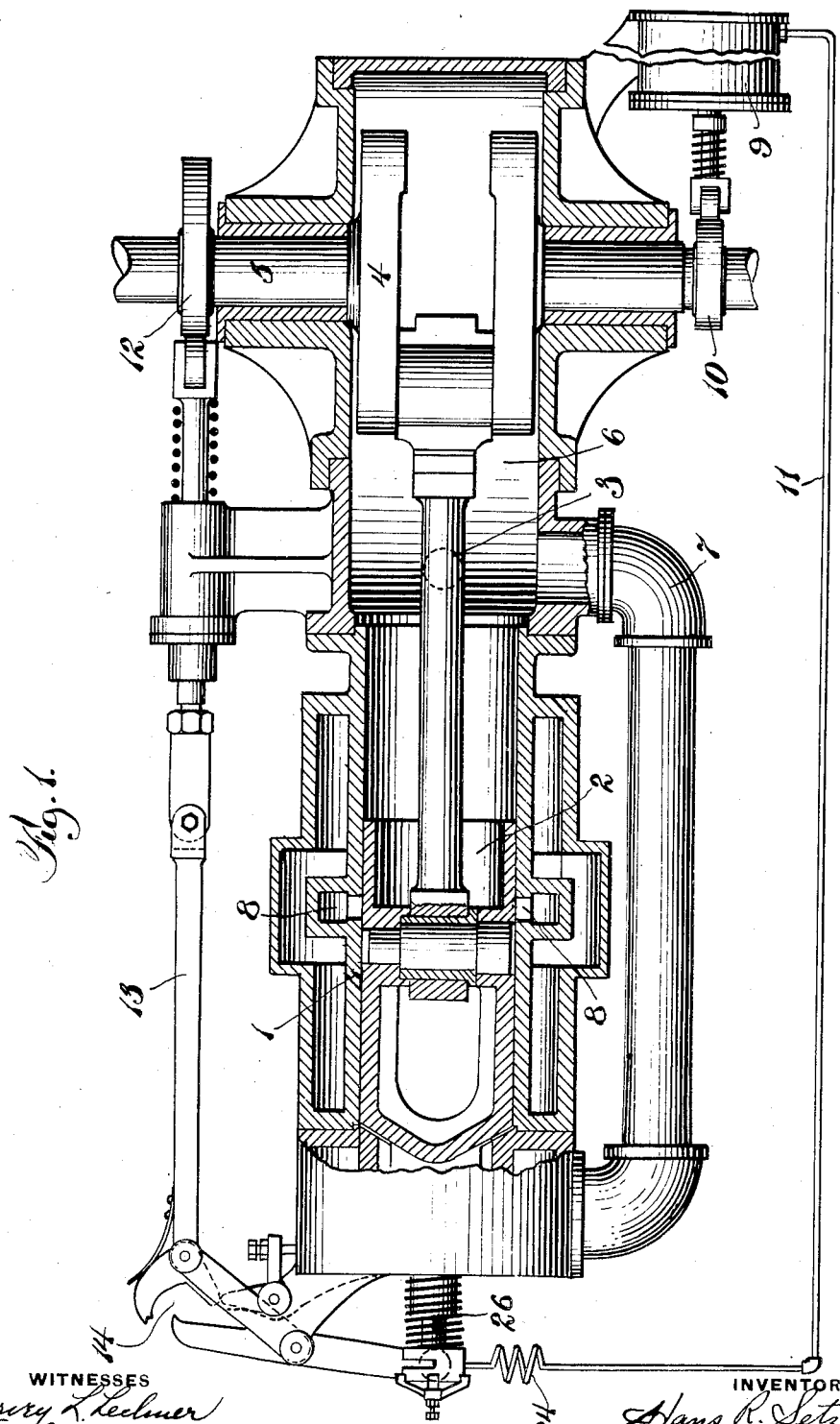

940,369.

Patented Nov. 16, 1909.

2 SHEETS—SHEET 2.

WITNESSES

INVENTOR
Hans R. Setz
by atty
Paul Synnestvedt

UNITED STATES PATENT OFFICE.

HANS R. SETZ, OF PITTSBURG, PENNSYLVANIA.

LIQUID-FUEL-COMBUSTION ENGINE.

940,369.  Specification of Letters Patent.  Patented Nov. 16, 1909.

Application filed February 27, 1909. Serial No. 480,456.

*To all whom it may concern:*

Be it known that I, H. R. SETZ, a citizen of Switzerland, residing at Pittsburg, in the county of Allegheny and State of Pennsylvania, have invented certain new and useful Improvements in Liquid-Fuel-Combustion Engines, of which the following is a specification.

Figure 3:
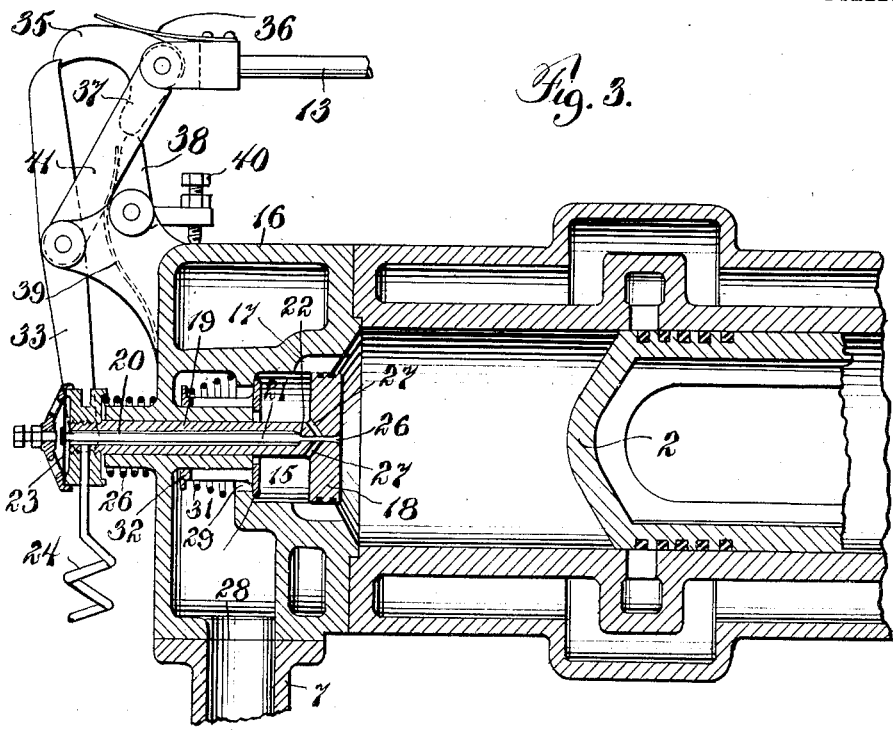
Figure 2:
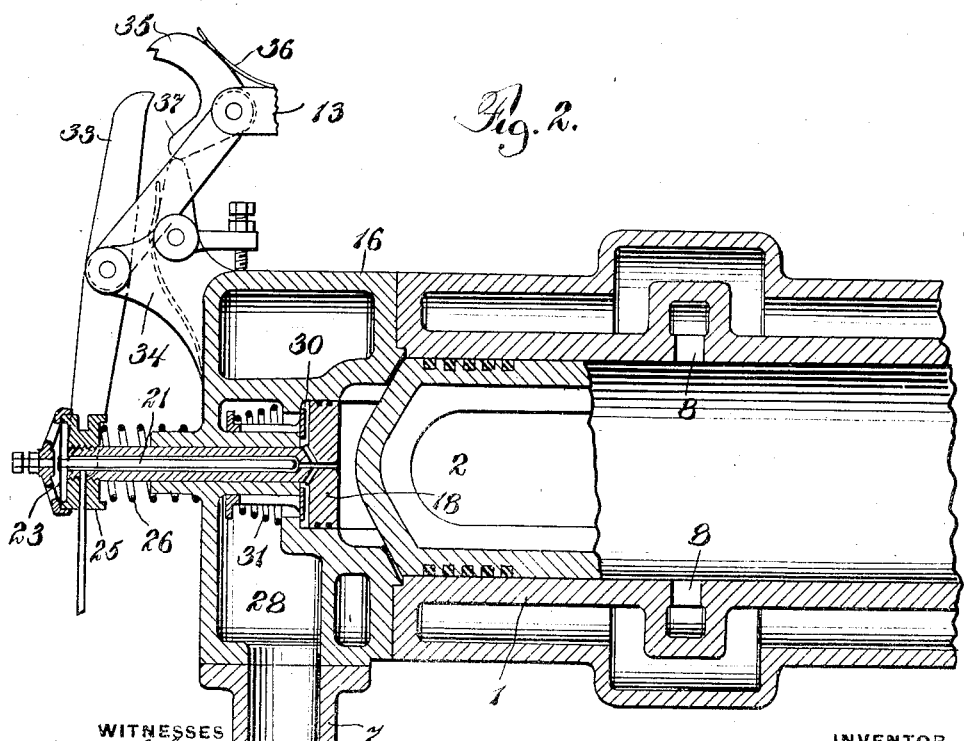

The invention relates to liquid fuel combustion engines and more especially to those having the cycle known as the Diesel-cycle wherein air alone is compressed to a pressure and temperature sufficiently high to ignite the fuel when it is being injected by means of air of a higher pressure than that in the cylinder. The object of the invention is to improve and simplify the engine structure in a manner to be more particularly pointed out hereinafter. One embodiment of the invention being illustrated in the accompanying drawings, wherein Figure 1 is a plan view of the engine partially in section, Figure 2 is an enlarged detail section through the cylinder, the parts being in the position assumed at the time of complete compression and ignition, and Figure 3 is a section similar to that of Figure 2, but with the parts in the position occupied just after the piston has commenced its rearward or compression stroke.

Engines of the Diesel-cycle type have been made subject to many improvements and patents, notably in the direction of simplifying arrangements to inject the fuel and compress the air required to inject the fuel. In some such improvements, which all work on the four stroke or Otto-cycle, part of the already compressed air in the cylinder is compressed still higher by means of a small auxiliary piston working in a special chamber in the cylinder head. From here this air passes through a passage in the cylinder head to a fuel injection nozzle, located beside the auxiliary piston, where fuel injection takes place. In addition to the special chamber with the auxiliary piston working therein, and the fuel injection nozzle, there is an air inlet and exhaust valve with their respective passages, also located in the cylinder head. All these parts are placed side by side in the cylinder head and adjacent to the combustion chamber. One result of the foregoing structure is that the shape of the cylinder head becomes very irregular, difficult to manufacture and dangerous in operation on account of internal strains. A further result is the uneven and unsymmetrical shape of the combustion chamber, preventing quick mixture of the injected fuel with the air, thus causing incomplete combustion, while during the period of ignition and expansion both inlet and exhaust valves and their seats are exposed to very high temperature which tend to shorten the life of these delicate parts. Finally, the operating mechanism required to control proper action of all these parts mentioned makes the cost of such engines too high to permit their general application.

In order to do away with these disadvantages, I run my engine on the two stroke cycle. According to my invention I make the fuel injection nozzle part of the auxiliary piston and arrange the air inlet valve, a concentric ring valve, so that it forms a part of the special injection air chamber wall above the auxiliary piston. With this arrangement a new air charge into the cylinder is admitted by means of the concentric ring valve, whose action is controlled by the auxiliary piston, first by entering the special chamber above the auxiliary piston, and then by flowing past this piston into the cylinder proper. At the end of the compression stroke fuel is admitted by means of a fuel valve and blown into the combustion chamber through the fuel nozzle, both being located in the auxiliary piston.

Referring first to the general arrangement as shown in Fig. 1, the principal engine parts may be enumerated as follows. 1 is the cylinder of the engine; 2 is the piston working in such cylinder; 3 is the connecting rod pivoted at one end in the piston 2 and at the other end to the crank 4 in the usual manner; 5 is the crank shaft journaled in the engine frame; 6 is a chamber communicating with the front end of the cylinder, in which chamber air is compressed on the forward stroke of the piston 2; 7 is a conduit leading from the chamber 6 to the rear end of the cylinder for supplying air to such end for compression and scavenging purposes in a manner to be hereinafter more particularly set forth; 8 are the exhaust ports for the cylinder; 9 is a pump operated from the eccentric 10 upon the crank shaft for supplying liquid fuel to the rear end of the cylinder through the pipe 11; and 12 is an eccentric upon crank shaft for operating the rod 13 and mechanism 14, which mechanism controls the operation of the fuel injecting device to be now described in detail.

By reference to Figs. 2 and 3, it will be seen that the rear end of the cylinder 1 opens into a recess or auxiliary cylinder 15 as it may be termed, which auxiliary cylinder is mounted in the cylinder head 16. This auxiliary cylinder is provided near its front end with guide ribs 17, and carries the auxiliary piston 18, which piston 18 is provided with a stem 19 and a fuel passage 20. In this fuel passage 20 is a needle valve 21 normally pressed down upon its seat 22 by means of the diaphragm 23 to which the upper end of the valve is secured in the manner illustrated. Fuel is supplied to this passage 20 from the fuel supply pipe 11 (Fig. 1) by means of the flexible connection 24. The piston stem 19 is provided with a head 25, and between this head and the outer surface of the cylinder head a spring 26 is interposed, which tends normally to carry the piston 18 to the position indicated in Figure 2. The passage 20 in the stem 19 is reduced at its inner end 26 to provide for the passage of the liquid fuel through the piston in a small stream, and one or more air passages 27 lead into this passage 26 from the rear side of the auxiliary piston, so that on the rearward movement of the auxiliary piston, a blast of air is forced through the small passage 26. Air from the front side of the piston 2 is supplied to the auxiliary cylinder 15, and main cylinder 1 by means of the conduit 7 (Fig. 1), which conduit leads to a chamber 28 in the cylinder head. This chamber 28 communicates with the rear end of the auxiliary cylinder 15 by means of the passage 29 and is governed by the ring valve 30 held normally in closed position by means of the spring 31 bearing against the head 32 of the ring valve. The auxiliary piston 18 is not permitted to move back to the position indicated in Figure 2, until the piston 2 approaches the rear end of its stroke, being held in the position of Figure 3, by means of the lever 33 whose forward end engages the head 25 and whose middle portion is pivoted upon a bracket 34 in the manner illustrated. The outer end of the lever 33 is adapted to be engaged and held in the position of Fig. 3 by means of a catch 35 carried by the rod 13, which catch is pressed forward by means of a spring 36. The short arm 37 of the catch 35 is adapted to be engaged by a second catch 38 pivoted upon the bracket 34 and held in the position indicated in Fig. 3 by means of a spring 39, the position of such catch being adjustable by means of the set screw 40. The catch 35 is moved to release position as indicated in Fig. 2 on the forward movement of the connecting rod 13, which movement during its first portion brings the catch 35 to the position indicated in Fig. 2. A further forward movement of the connecting rod 13 carries the arm 37 of the catch 35 past the outer end of the catch 38, and the spring 36 thereupon forces the catch 35 to its original position, so that on a rearward movement of the connecting rod 13, the end of the catch 35 engages the end of the lever 33 and moves the parts to the position of Figure 3, the outer end of the catch 38 being pressed to the rear by the arm 37 during this movement to permit the passage of such arm 37 to the position indicated in Figure 3. A link 41 is provided for guiding the end of the rod 13.

Referring now to Figures 1 and 3, the operation, starting with the piston 2 in the position indicated in Fig. 3, may be enumerated as follows. The piston 2 when in this position is just beginning its upward or compression stroke, and has just covered the ring of the exhaust ports, the auxiliary piston 18 at this time being held down by means of the lever 33. The auxiliary piston is maintained in this position throughout the entire compression stroke of the piston 2, so that there is free communication between the cylinder and the auxiliary chamber or cylinder 15 during this time, and the pressure in the two chambers is the same throughout the stroke. Just before the piston 2 reaches the end of its rear stroke, the cam 12 governing the connecting rod 13 permits this rod to move forward thus releasing the lever 33 and permitting the spring 26 to force the auxiliary piston 18 suddenly backward to the position indicated in Fig. 2. During this movement the auxiliary piston first cuts off communication between the two cylinders, and then compresses a part of the already compressed air in the auxiliary cylinder 15, thus causing the air in the auxiliary cylinder to flow at a very high velocity through the passages 27 and 26 into the main cylinder. At this moment the pump 9 (Fig. 1) operates to force a certain amount of fuel (which amount can be regulated in any desired manner) through the pipe 11 and connection 24, which is flexible, and into the passage 20 in the hollow piston stem 19. This flow of fuel deflects the diaphragm 23 slightly, causing the needle valve 21 to move back from its seat and permitting the required amount of fuel to escape through the passage 26, whence the air-jets coming from the passages 27 will blow it forward into the main cylinder or combustion chamber in the form of a spray. Ignition then occurs, due to the high compression temperature of the air inclosed in the combustion chamber, and expansion occurs forcing the piston forward through its expansion stroke. After the piston 2 has completed about 90% of its expansion stroke it uncovers the ring of exhaust ports 8, which allows almost instant release of the pressure inside the cylinder.

During this process the auxiliary piston 18 remains in a position above the annular passage in which the ribs 17 are mounted. After the ports 8 have been uncovered long enough to effect complete release of pressure, and secure the greatest possible reduction in temperature of the gas remaining in the cylinder, the piston 18 is moved back to the position indicated in Fig. 3, by reason of the engagement of the lever 35 with the end of the lever 33 in the manner heretofore indicated, and scavenging air slightly compressed in the chamber 6 during the expansion stroke of the piston 2 enters the auxiliary cylinder 15, the light annular valve 30 being moved from its seat by reason of the greater pressure in the chamber 28. The scavenging air thus first enters the chamber 15 and from thence flows past the auxiliary piston and into the cylinder, where it cleans such cylinder from the rest of the spent gases by pushing them through the exhaust ports 8. A charge of pure air is therefore left in the cylinder by the time the piston 2 has on the beginning of its compresion stroke, covered the ports 8 again, when the valve 30 returns automatically to its seat.

The advantage of making the fuel valve and the fuel nozzle part of the auxiliary piston lies in the fact that, by simple mechanical means the fuel may be kept entirely separate from the compressed air until the moment of injection, thus eliminating the possibility of preignition. Furthermore the amount of fuel injected is completely controlled while it is being injected, thus securing the closest possible regulation. The placing of the air inlet valve in the top of the injection air chamber 15, above the auxiliary piston 18, is advantageous, in that the valve is thus separated from the combustion chamber, and prevented from coming into contact with gas of very high temperatures, while during the admission period the entering air serves as a medium to keep the auxiliary piston comparatively cool. This auxiliary piston in turn controls the air admission as above explained, thus doing away with the operating mechanism otherwise required for the proper action of the air inlet valve. The arrangement as described and illustrated also gives a very simple cylinder head, and perfectly symmetrically combustion chamber, thus fulfilling the requirements for a cheap and effective engine. Other advantages incident to the construction will be apparent to those skilled in the art.

Having thus described my invention and illustrated its use, what I claim as new and desire to secure by Letters Patent is the following:—

1. In a liquid fuel combustion engine having a main cylinder provided with an exhaust port intermediate its ends and a piston, an auxiliary cylinder opening into the end of the main cylinder, and an auxiliary piston arranged to open and cut off communication between the two cylinders and provided with a passage for supplying liquid fuel to the main cylinder and with a second passage leading from the rear side of the piston to the fuel passage.

2. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, and means for forcing a charge of liquid fuel through the passage when the piston approaches the rear end of its stroke.

3. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, a valve in the fuel passage, and means for opening the valve and injecting a charge of fuel through the passage when the main and auxiliary pistons approach the rear ends of their strokes.

4. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, and controlling and operating means for the auxiliary piston whereby it is maintained in forward position with the two cylinders in communication until the main piston approaches the rear end of its stroke and then moved back cutting off communication between the cylinders and forcing the air at its rear side through the said second passage.

5. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, yielding means normally tending to carry the auxiliary piston to the rear, a catch for maintaining such piston in its forward position until the main piston approaches the rear end of its stroke, and means for then releasing the catch to permit the yielding means to carry the auxiliary piston to the rear.

6. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, a reciprocatory valve in the fuel passage, a diaphragm for normally maintaining the valve in closed position, and means for periodically forcing a flow of fuel beneath the diaphragm whereby the valve is opened and the fuel discharged to the main cylinder.

7. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, a reciprocatory valve in the fuel passage, means for periodically forcing a flow of fuel into the fuel passage, and valve operating means controlled by the said periodic flow.

8. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, and an admission passage into the auxiliary cylinder controlled by a check valve for admitting air to the cylinders when the pistons move forward.

9. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, a communication extending from the front side of the main piston to the rear side of the auxiliary piston whereby air is forced into the auxiliary and main cylinders on the forward movement of the pistons, and a check valve for such communication.

10. In a liquid fuel combustion engine having a main cylinder provided with an exhaust port intermediate its ends and a piston, an auxiliary cylinder in alinement with and opening into the end of the main cylinder, an auxiliary piston working in such auxiliary cylinder, the auxiliary cylinder and piston being so arranged that an annular port connecting the cylinders is provided between the periphery of the piston, and the cylinder wall when the piston is in forward position, a fuel supply conduit extending through the auxiliary piston, and an air passage leading from the rear side of such piston to the conduit.

11. In a liquid fuel combustion engine having a main cylinder provided with an exhaust port intermediate its ends and a piston, an auxiliary cylinder in alinement with an opening into the end of the main cylinder, an auxiliary piston working in such auxiliary cylinder, the auxiliary cylinder and piston being so arranged that an annular port connecting the cylinders is provided between the periphery of the piston and the cylinder wall when the piston is in forward position, a fuel supply conduit extending through the auxiliary piston, an air passage leading from the rear side of such piston to the conduit, a communication extending from the front side of the main piston to the rear side of the auxiliary piston, and a check valve for such communication.

12. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, and an admission passage into the auxiliary cylinder for admitting air to the cylinders when the pistons move forward.

13. In a liquid fuel combustion engine having a main cylinder provided with an exhaust port intermediate its ends and a piston, an auxiliary cylinder opening into the end of the main cylinder, an auxiliary piston arranged to open and cut off communication between the two cylinders and provided with a passage for supplying liquid fuel to the main cylinder and with a second passage leading from the rear side of the piston to the fuel passage, an admission passage into the auxiliary cylinder, and controlling means for the piston whereby it is maintained in position closing communication between the cylinders until the main piston uncovers the exhaust port.

14. In an explosion motor provided with a cylinder and piston, a combined compression and admission chamber opening into the end of the cylinder, a compression piston therein provided with fuel admission and blast passages and arranged to place the chamber and cylinder in communication on its forward stroke and cut off such communication on its rearward stroke, and a valve controlled admission port for the chamber.

15. In an explosion motor provided with a cylinder and piston, a combined compression and admission chamber opening at one end into the cylinder and at the other end having an admission valve, and a piston in the chamber so arranged as to place the chamber and cylinder in communication on its forward stroke and cut off such communication on its rearward stroke.

16. In a Diesel-cycle motor, a cylinder head provided with an admission chamber and an admission passage leading into the outer end of the chamber, a valve for controlling the passage, a piston in the chamber for controlling admission therethrough to the cylinder, and means for operating the piston.

In testimony whereof I have hereunto signed my name in the presence of the two subscribed witnesses.

HANS R. SETZ.

Witnesses:
    JAMES C. BRADLEY,
    DOERING BELLINGER.